(12) United States Patent
Lee (10) Patent No.: US 10,814,781 B2
(45) Date of Patent: Oct. 27, 2020

(54) REAR OCCUPANT ALERT METHOD AND VEHICLE FOB DEVICE USING THE SAME

(71) Applicants: Hyundai Motor Company, Seoul (KR); Kia Motors Corporation, Seoul (KR)

(72) Inventor: Yong-Joo Lee, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 48 days.

(21) Appl. No.: 16/213,847

(22) Filed: Dec. 7, 2018

(65) Prior Publication Data

US 2020/0086785 A1 Mar. 19, 2020

(30) Foreign Application Priority Data

Sep. 14, 2018 (KR) ........................ 10-2018-0110386

(51) Int. Cl.
*B60Q 9/00* (2006.01)

(52) U.S. Cl.
CPC ...................................... *B60Q 9/00* (2013.01)

(58) Field of Classification Search
CPC ........... B60Q 9/00; G08B 21/22; G08B 21/24
See application file for complete search history.

(56) References Cited

U.S. PATENT DOCUMENTS

| | | | |
|---|---|---|---|
| 8,326,498 B2 | 12/2012 | Witek | |
| 9,545,856 B2 | 1/2017 | Borgne et al. | |
| 9,805,574 B1 | 10/2017 | Espinoza et al. | |
| 2007/0018812 A1* | 1/2007 | Allen | G08B 21/0202 340/539.13 |
| 2007/0075575 A1* | 4/2007 | Gregory, II | B60N 2/002 297/217.3 |
| 2007/0229243 A1* | 10/2007 | Welch | B60N 2/26 340/457 |
| 2008/0316043 A1* | 12/2008 | Gomes | B60N 2/28 340/686.6 |
| 2014/0266694 A1* | 9/2014 | McCluskey | G08B 21/0453 340/539.12 |
| 2017/0043714 A1 | 2/2017 | Lewis-Cheeks | |
| 2017/0298659 A1* | 10/2017 | Watanabe | E05B 77/48 |

(Continued)

FOREIGN PATENT DOCUMENTS

| | | |
|---|---|---|
| JP | 2014097677 A | 5/2014 |
| KR | 101023392 B1 | 3/2011 |

*Primary Examiner* — Sisay Yacob
(74) *Attorney, Agent, or Firm* — Mintz Levin Cohn Ferris Glovsky and Popeo, P.C.; Peter F. Corless (57) ABSTRACT

A rear occupant alert method for a vehicle may include: before a door opening or closing event of the vehicle, sensing a master fob and a slave fob through low frequency (LF) antennas in the vehicle to obtain first position information of the master fob and the slave fob; after the door opening or closing event of the vehicle, sensing the master fob and the slave fob through the LF antennas to obtain second position information of the master fob and the slave fob; determining positions of the master fob and the slave fob, respectively, by comparing the first position information of the master fob and the slave fob with the second position information of the master fob and the slave fob; and performing a rear occupant alert function in accordance with the determined positions of the master fob and the slave fob.

14 Claims, 4 Drawing Sheets

(56) References Cited

U.S. PATENT DOCUMENTS

| | | |
|---|---|---|
| 2018/0065504 A1 | 3/2018 | Lan et al. |
| 2018/0126872 A1 | 5/2018 | Folino |
| 2019/0057595 A1* | 2/2019 | Yamamoto ............. G08B 21/22 |
| 2019/0168635 A1* | 6/2019 | McLaughlin ............ B60N 2/28 |

* cited by examiner

FIG. 1

OUTSIDE: MASTER FOB
INSIDE: SLAVE FOB

FIG. 2A

OUTSIDE: SLAVE FOB
INSIDE: MASTER FOB

REAR OCCUPANT ALERT METHOD AND VEHICLE FOB DEVICE USING THE SAME

CROSS-REFERENCE TO RELATED APPLICATION

This application claims the benefit of priority to Korean Patent Application No. 10-2018-0110386, filed in the Korean Intellectual Property Office on Sep. 14, 2018, the entire contents of which are incorporated herein by reference.

BACKGROUND OF THE DISCLOSURE

Technical Field

The present disclosure relates to a rear occupant alert method and a vehicle fob device using the same, and more particularly, to a rear occupant alert method for preventing an accident of a rear occupant by performing a rear occupant alert function in accordance with the position of a fob key, and a vehicle fob device using the method.

Description of Related Art

A Rear Occupant Alert (ROA) has been used recently for preventing accidents that may occur after a vehicle is stopped. For example, the ROA can help prevent accidents due to neglect of infants in a rear seat of a vehicle.

The ROA uses a sensor to sense an occupant in the vehicle and then notifies a driver when an occupant gets in the rear seat of the vehicle. The ROA senses "movement" of the occupant in the rear seat and notifies the driver, e.g., a simple check message through a cluster.

The ROA can determine whether there is a person in the rear seat on the basis of whether a rear door is opened and closed, and then notify a driver through a cluster alert message or a voice that an occupant is present when the driver stops the engine and opens a door. If a driver exits the vehicle without recognizing the person in the rear seat, an ultrasonic sensor mounted on the interior headlining determines whether the occupant is present by sensing movement in the vehicle. Then, the system can activate an emergency light or an alarm, transmit text message to the driver, etc.

However, conventional ROAs may generate a vehicle alert in unintended situations. For example, when a rear door is opened and closed without an infant in a rear seat, a primary alert may be generated unnecessarily. Further, when the ultrasonic wave-based ROA function is applied, the conventional ROA cannot sense an occupant in the rear seat if, for instance, an infant is asleep or not moving over a predetermined time. Further, in conventional ROAs, a dark current may be continuously generated due to operation of the ultrasonic sensor after a driver leaves a vehicle.

Accordingly, there is a need for a method that informs the driver of an unnecessary alert or gives an accurate alert even though there is no movement of an occupant in the rear seat.

SUMMARY OF THE DISCLOSURE

An object of the present disclosure is to provide an alert generation method for preventing an accident of a rear occupant by performing a rear occupant alert function in accordance with the position of a fob key, that is, the positions of a master fob and a slave fob, and a vehicle fob device using the method.

In accordance with embodiments of the present disclosure, a rear occupant alert method may include: before a door opening or closing event of the vehicle, sensing a master fob and a slave fob through low frequency (LF) antennas in the vehicle to obtain first position information of the master fob and the slave fob; after the door opening or closing event of the vehicle, sensing the master fob and the slave fob through the LF antennas to obtain second position information of the master fob and the slave fob; determining positions of the master fob and the slave fob, respectively, by comparing the first position information of the master fob and the slave fob with the second position information of the master fob and the slave fob; and performing a rear occupant alert function in accordance with the determined positions of the master fob and the slave fob.

The master fob and the slave fob may be identified by fob IDs, respectively.

The first and second position information of the master fob and the slave fob may be obtained through data communication with the LF antennas which are disposed at locations inside and outside of the vehicle.

The master fob may be a fob key for a driver and may perform a fob function for the vehicle.

The slave fob may be a fob key for a rear occupant and may have only a low-cost communication module that can perform LF communication and RF feedback.

The slave fob may be a wearable device.

The performing of the rear occupant alert function may include generating a rear occupant neglect alert when it is determined that the master fob is positioned outside of the vehicle and the slave fob is positioned inside of the vehicle.

The performing of the rear occupant alert function may include generating a rear occupant exit alert function when it is determined that the master fob is positioned inside of the vehicle and the slave fob is positioned outside of the vehicle.

Furthermore, a according to embodiments of the present disclosure, a vehicle fob device for a vehicle may include: at least one processor; and a memory storing computer-readable instructions, wherein, when the at least one processor executes the stored instructions, the at least one processor is configured to: sense a master fob and a slave fob through low frequency (LF) antennas in the vehicle to obtain first position information of the master fob and the slave fob before a door opening or closing event of the vehicle; sense the master fob and the slave fob through the LF antennas to obtain second position information of the master fob and the slave fob after the door opening or closing event of the vehicle; determine positions of the master fob and the slave fob, respectively, by comparing the first position information of the master fob and the slave fob with the second position information of the master fob and the slave fob; and perform a rear occupant alert function in accordance with the determined positions of the master fob and the slave fob.

The at least one processor may be further configured to perform a rear occupant neglect alert function when it is determined that the master fob is positioned outside the vehicle and the slave fob is positioned inside the vehicle.

The at least one processor may be further configured to perform a rear occupant exit alert function when it is determined that the master fob is positioned inside of the vehicle and the slave fob is positioned outside of the vehicle.

According to the present disclosure, it is possible to prevent an accident due to abandonment of a rear occupant by performing rear occupant alert function in accordance with the position of a fob key, that is, the positions of a master fob and a slave fob, respectively.

Further, it is possible to reduce manufacturing costs in comparison to conventional rear occupant alert methods (e.g., an ultrasonic or radar method) using the current smart key intact.

Further, it is possible to not only sense a rear seat that is a limit in an existing rear occupant alert function, but provide a passenger-seat occupant alert function.

Further, it is possible to sense a rear occupant even if the rear occupant does not move or is asleep.

Further, even if a rear occupant leaves a vehicle against the driver's intent, it is possible to notify the driver of the departure.

Further, it is possible to manufacture the device as a wearable device for preventing safety accidents inside or outside of the vehicle.

Further, it is possible to reduce dark current caused by a sensor-based rear occupant alert function.

BRIEF DESCRIPTION OF THE DRAWINGS

The embodiments herein may be better understood by referring to the following description in conjunction with the accompanying drawings, briefly described below, in which like reference numerals indicate identically or functionally similar elements.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DESCRIPTION OF SPECIFIC EMBODIMENTS

Hereinafter, exemplary embodiments of the present disclosure will be described in detail with reference to the accompanying drawings. However, well-known function or configurations that may make the spirit of the present disclosure unclear are not described in detail in the following description and the accompanying drawings. Further, it should be noted that the same components are given the same reference numerals in the drawings.

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the terms and words as terms for describing most appropriately the best method he or she knows for carrying out the disclosure.

Accordingly, the embodiments described herein and the configurations shown in the drawings are only most preferable embodiments of the present disclosure and do not represent all of the technical spirits of the present disclosure, so it should be appreciated that there may be various equivalents and modifications that can replace the embodiments and the configurations at the time at which the present application is filed.

In the accompanying drawings, comes configurations may be exaggerated, omitted, or schematically shown, and the sizes of the configurations do not fully reflect the actual sizes. The present disclosure is not limited to the relative sizes of gaps shown in the accompanying drawings.

Throughout the present specification, unless explicitly described otherwise, "comprising" any components will be understood to imply the inclusion of other components rather than the exclusion of any other components. Further, when an element is referred to as being "connected with" another element, it may be "directly connected" to the other element and may also be "electrically connected" to the other element with another element intervening therebetween.

Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Further, the term "unit" used herein means a hardware component such as software, FPGA, or ASIC and the "unit" performs predetermined functions. However, the term "unit" is not limited to software or hardware. A "unit" may be configured to be stored in a storage medium that can be addressed or may be configured to regenerate one or more processors. Accordingly, for example, the "unit" includes components such as software components, object-oriented software components, class components, and task components, processors, functions, properties, procedures, subroutines, segments of a program code, drivers, firmware, a microcode, a circuit, data, a database, data structures, tables, arrays, and variables. Functions provided by the components and the "unit" may be combined in a smaller number of components and "unit" or may be further separated into additional components and "unit".

Hereafter, embodiments of the present disclosure will be described in detail with reference to the accompanying drawings such that those skilled in the art can easily accomplish the present disclosure. However, the present disclosure may be modified in various different ways and is not limited to the embodiments described herein. Further, in the accompanying drawings, components irrelevant to the description will be omitted in order to obviously describe the present disclosure, and similar reference numerals will be used to describe similar components throughout the specification.

Hereinafter, embodiments of the present disclosure will be described in detail with reference to the accompanying drawings.

Figure 1:
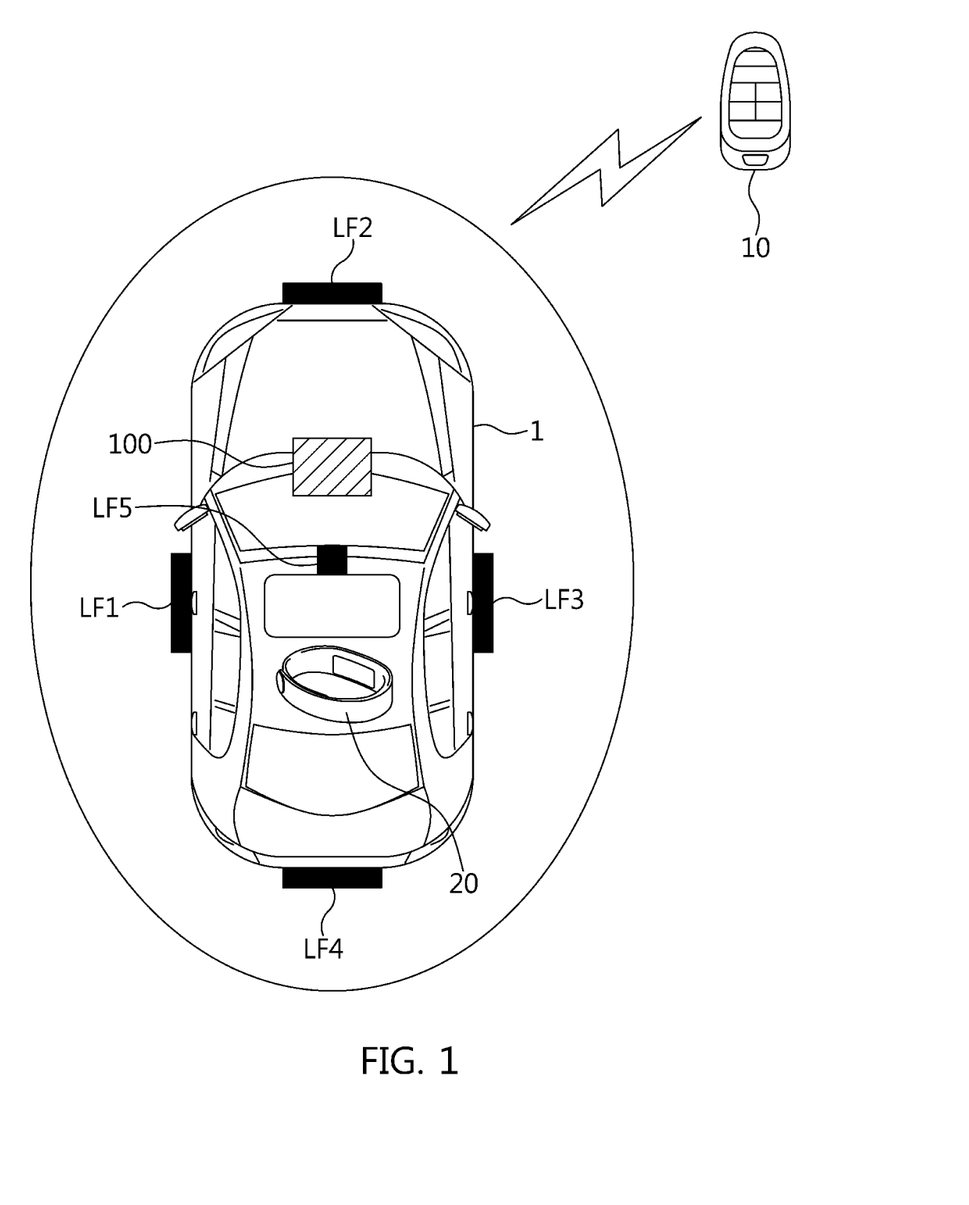
FIG. 1 is a view showing a vehicle fob device according to embodiments of the present disclosure.

FIG. 1 is a view showing a vehicle fob device according to embodiments of the present disclosure.

As shown in FIG. 1, a vehicle fob device 100 according to embodiments of the present disclosure performs an ROA function in accordance with the position of a fob key.

The fob key includes a master fob 10 and a slave fob 20. That is, the master fob 10 is a fob key that a driver possesses and enables common fob functions (e.g., door-lock, unlock, panic, and tail gate operation) that are used for a vehicle 1. The slave fob 20, which is a fob key that a rear occupant possesses, is manufactured such that it provides a fundamental communication module that can perform data transmission/reception with the vehicle fob device 100 (i.e., a low-cost communication module that can perform LF communication and RF feedback). The slave fob 20 is manufactured as a wearable device that a rear occupant can wear such as a band, a necklace, and a ring.

The master fob 10 and the slave fob 20 can be identified by fob IDs that are their own identifiers. The fob IDs of the master fob 10 and the slave fob 20 are recorded in the vehicle fob device 100.

The "rear occupant" may be an occupant (e.g., an infant, an elderly man, etc.) who has high possibility of a safety accident because he/she has difficulty in getting off a vehicle by himself/herself when a driver leave the vehicle, because he/she sits at a position out of the visual field of the driver.

The vehicle fob device 100 can perform data communication with the fob key, that is, the master fob 10 and the slave fob 20 through LF antennas LF1~LF5 disposed at principal portions inside and outside a vehicle. Accordingly, the vehicle fob device 100 can sense the positions of the master fob 10 and the slave 20 inside/outside the vehicle through the LF antennas LF1~LF5.

The vehicle fob device 100 includes at least one processor and a memory for storing computer-readable instructions. The at least one processor can provide an ROA function by executing the computer-readable instructions stored in the memory.

As described above, the vehicle fob device 100 can provide an ROA function even if there is no movement of a rear occupant or there is no specific sensor for sensing a rear occupant in a vehicle by locating the slave fob 20.

Hereafter, generation of an alert due to neglect of an occupant is described with reference to FIG. 2A, as an example of the ROA function, and generation of an alert due to exit of an occupant is described with reference to FIG. 2B.

Figure 2A:
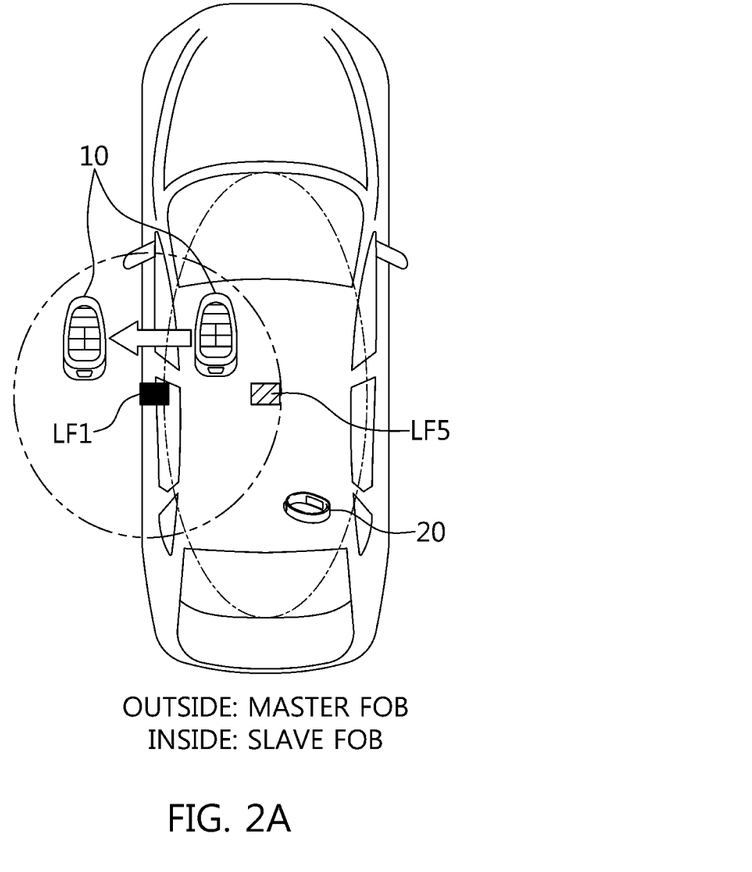
FIG. 2A is a view showing a case in which an alert is generated due to neglect of an occupant.
Figure 2B:
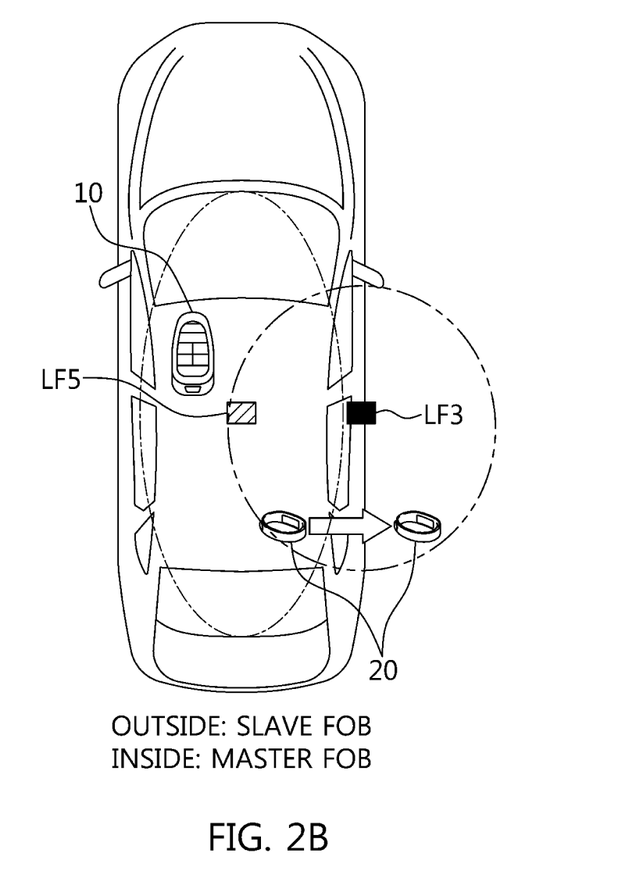
FIG. 2B is a view showing a case in which an alert is generated due to exit of an occupant.

FIG. 2A is a view showing a case in which an alert is generated due to neglect of an occupant and FIG. 2B is a view showing a case in which an alert is generated due to exit of an occupant.

The vehicle fob device 100 generates an alert for neglect of an occupant (see FIG. 2A) or exit of an occupant (see FIG. 2B) by checking the positions of the master fob 10 and the slave fob 20.

A driver possesses the master fob 10 and a rear occupant possesses the slave fob 20. The vehicle fob device 100 checks whether the master fob 10 and the slave fob 20 are in a vehicle through an LF antenna (LF5) in the vehicle and checks whether the master fob 10 and the slave fob 20 are positioned outside of the vehicle through LF antennas LF1~LF4 outside of the vehicle.

Referring to FIG. 2A, the vehicle fob device 100 determines whether the master fob 10 and the slave fob 20 are in a vehicle through an LF antenna (LF5) in the vehicle and determines whether the master fob 10 is positioned outside of the vehicle through the LF antenna LF1 on the left outer side of the vehicle.

When it is found out that the master fob 10 is positioned outside of the vehicle and the slave fob 20 is positioned inside of the vehicle, the vehicle fob device 100 can generate an alert for neglect of an occupant by determining that the driver has leaved the vehicle and the occupant is abandoned in the vehicle.

Referring to FIG. 2B, the vehicle fob device 100 determines whether the master fob 10 and the slave fob 20 are in a vehicle through an LF antenna (LF5) in the vehicle and determines whether the slave fob 20 is positioned outside the vehicle through the LF antenna LF3 on the right outer side of the vehicle.

When it is found out that the master fob 10 is positioned inside the vehicle and the slave fob 20 is positioned outside the vehicle, the vehicle fob device 100 can generate an alert for exit of an occupant by determining that the occupant has leaved the vehicle.

Figure 3:
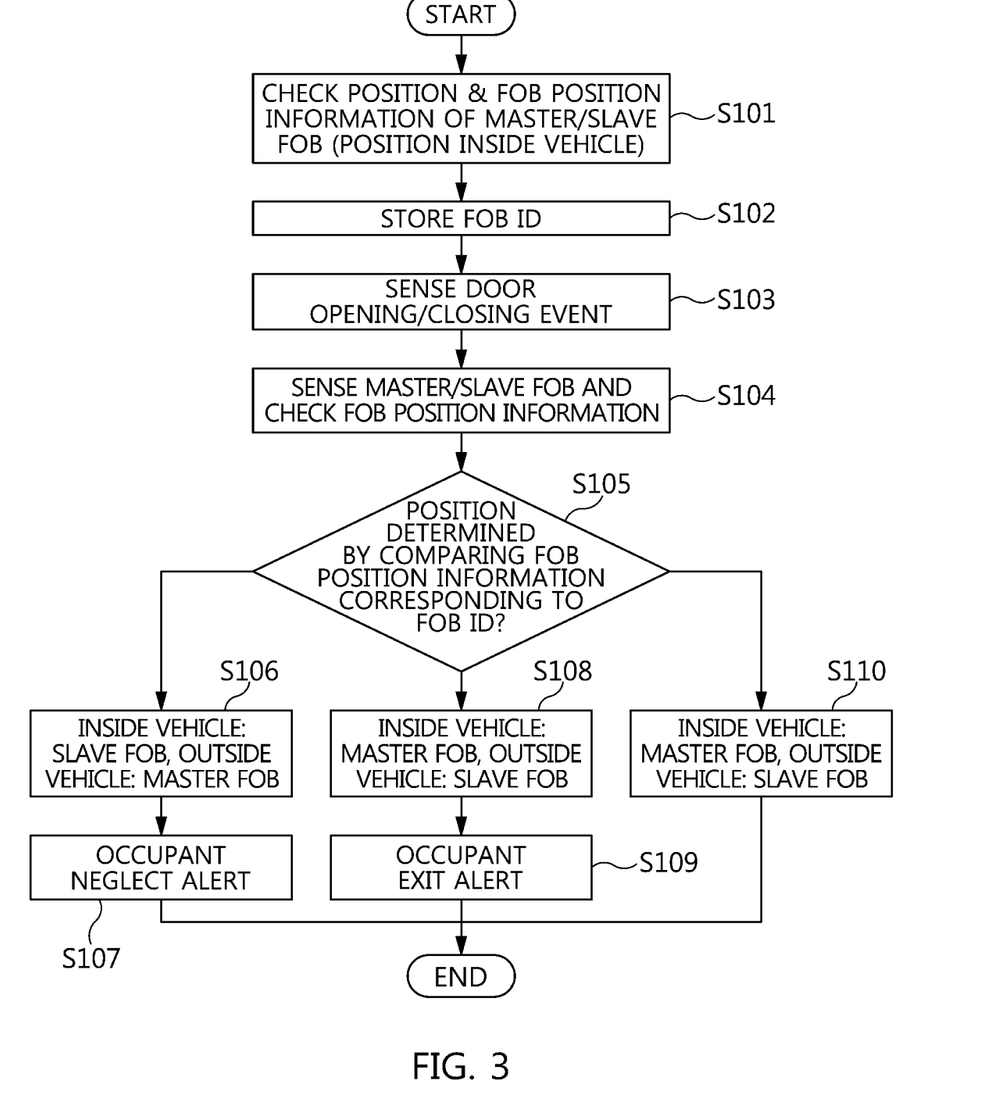
FIG. 3 is a view showing a rear occupant alert method according to embodiments of the present disclosure.

FIG. 3 is a view showing a rear occupant alert method according to embodiments of the present disclosure.

As shown in FIG. 3, the vehicle fob device 100 determines fob position information (i.e., "first position information") of the master fob 10 and the slave fob 20 sensed through the LF antennas LF1~LF5 on the vehicle 1 (S101), before sensing a door opening or closing event.

The vehicle fob device 100 stores the fob position information in correspondence to the fob IDs of the master fob 10 and the slave fob 20 (S102). In this case, since both of the driver and the occupant are in the vehicle, the fob position information of the master fob 10 and the slave fob 20 is position information corresponding to the inside of the vehicle.

Thereafter, when the vehicle fob device 100 senses a door opening or closing event (e.g., opening or closing of a door) (S103), it determines the fob position information (i.e., "second position information") of the master fob 10 and the slave fob 20 sensed through the LF antennas LF1~LF5 on the vehicle 1. The LF antennas LF1~LF5 on the vehicle can be driven again when a door opening or closing event of the vehicle is sensed.

Next, the vehicle fob device 100 determines the positions of the master fob 10 and the slave fob 20 by comparing the fob position information corresponding to the fob IDs of the master fob 10 and the slave fob 20 checked before and after the door opening/closing event of the vehicle 1 (S105). In this case, the vehicle fob device 100 determines that the positions of the master fob 10 and the slave fob 20 are the outside or the inside of the vehicle.

In detail, when the fob position information corresponding to the fob ID of the master fob 10 is different as the result of comparing the fob position information corresponding to the fob ID (S106), it is determined that the driver is positioned outside the vehicle, so the vehicle fob device 100 performs an occupant neglect alert function (S107).

In addition, since the master fob 10 is positioned inside the vehicle in step S101 but is positioned outside the vehicle in step S104, the fob position information is different in the result of comparison in step S106. However, since the slave fob 20 is positioned inside the vehicle in step S101 and is still positioned inside the vehicle in step S104, the fob position information is maintained in the result of comparison in step S106. Accordingly, in step S106, the master fob 10 is positioned outside the vehicle and the slave fob 20 is positioned inside the vehicle.

Next, when the fob position information corresponding to the fob ID of the slave fob 20 is different as the result of comparing the fob position information corresponding to the fob ID (S108), the vehicle fob device 100 determines that the occupant is positioned outside the vehicle, so it performs an occupant exit alert function (S109).

In addition, since the master fob 10 is positioned inside the vehicle in step S101 and is still positioned inside the vehicle in step S104, the fob position information is maintained in the result of comparison in step S106. However, since the slave fob 20 is positioned inside the vehicle in step S101 but is positioned outside the vehicle in step S104, the fob position information is different in the result of comparison in step S108. Accordingly, in step S108, the master fob 10 is positioned inside the vehicle and the slave fob 20 is positioned outside the vehicle.

Next, when the fob position information corresponding to the fob IDs of the master fob 10 and the slave fob is maintained as the result of comparing the fob position information corresponding to the fob IDs (S110), it is determined that both of the driver and the occupant still remain in the vehicle, so the vehicle fob device 100 does not perform the occupant neglect or exit alert function.

Meanwhile, in step S105, when a plurality of master fobs and slave fobs has been recorded (that is, fob IDs of a plurality of master fobs and slave fobs have been recorded), it is required to separately provide the occupant neglect or exit alert function for each of the master fobs and the slave fobs.

That is, even if it is determined that the first master fob is positioned inside the vehicle in step 101 and the second master fob is positioned outside the vehicle in step S104, the vehicle fob device 100 does not determine that the master fobs are positioned outside the vehicle, as in step S106. In this case, the vehicle fob device 100 performs any one of steps 106, 108, and 110 in accordance with the result of comparison in step S105.

The method according to embodiments of the present disclosure may be implemented in a program that can be executed by various computers and may be recorded on computer-readable media. The computer-readable media may include program commands, data files, and data structures of combinations thereof. The program commands that are recorded on the media may be those specifically designed and configured for the present disclosure or may be those available and known to those engaged in computer software in the art. The computer-readable recording media include magnetic media such as hard disks, floppy disks, and magnetic media such as a magnetic tape, optical media such as CD-ROMs and DVDs, magneto-optical media such as floptical disks, and hardware devices specifically configured to store and execute program commands, such as ROM, RAM, and flash memory. The program commands include not only machine language compiled by a compiler, but also high-level language code that can be executed by a computer using an interpreter.

Although above description addresses new characteristics of the present disclosure that are applied to various embodiments, it will be understood by those skilled in the art that the configuration and details of the device and method described above may be removed, replaced, and modified in various way without departing from the scope of the present disclosure. Accordingly, the scope of the preset disclosure is defined by the following claims rather than the above description. All modifications within equivalent ranges to the claims are included in the scope of the present disclosure.

What is claimed is:

1. A rear occupant alert method for a vehicle comprising:
    before a door opening or closing event of the vehicle, sensing a master fob and a slave fob through low frequency (LF) antennas in the vehicle to obtain first position information of the master fob and the slave fob;
    after the door opening or closing event of the vehicle, sensing the master fob and the slave fob through the LF antennas to obtain second position information of the master fob and the slave fob;
    determining positions of the master fob and the slave fob, respectively, by comparing the first position information of the master fob and the slave fob with the second position information of the master fob and the slave fob; and
    performing a rear occupant alert function including a rear occupant neglect alert and a rear occupant exit alert in accordance with the determined positions of the master fob and the slave fob,
    wherein the rear occupant neglect alert is generated when it is determined that the master fob is positioned outside the vehicle and the slave fob is positioned inside the vehicle.

2. The method of claim 1, wherein the master fob and the slave fob are identified by fob IDs, respectively.

3. The method of claim 1, wherein the first and second position information of the master fob and the slave fob is obtained through data communication with the LF antennas which are disposed at locations inside and outside of the vehicle.

4. The method of claim 1, wherein the master fob is a fob key for a driver and is configured to perform a fob function for the vehicle.

5. The method of claim 1, wherein the slave fob is a fob key for a rear occupant and includes a low-cost communication module configured to perform LF communication and radio frequency (RF) feedback.

6. The method of claim 5, wherein the slave fob is a wearable device.

7. The method of claim 1, wherein rear occupant exit alert is generated when it is determined that the master fob is positioned inside of the vehicle and the slave fob is positioned outside of the vehicle.

8. A vehicle fob device for a vehicle comprising:
    at least one processor; and
    a memory storing computer-readable instructions, wherein, when the at least one processor executes the stored instructions, the at least one processor is configured to:
    sense a master fob and a slave fob through low frequency (LF) antennas in the vehicle to obtain first position information of the master fob and the slave fob before a door opening or closing event of the vehicle;
    sense the master fob and the slave fob through the LF antennas to obtain second position information of the master fob and the slave fob after the door opening or closing event of the vehicle;
    determine positions of the master fob and the slave fob, respectively, by comparing the first position information of the master fob and the slave fob with the second position information of the master fob and the slave fob; and
    perform a rear occupant alert function including a rear occupant neglect alert and a rear occupant exit alert in accordance with the determined positions of the master fob and the slave fob,
    wherein the at least one processor is configured to perform the rear occupant neglect alert when it is determined that the master fob is positioned outside the vehicle and the slave fob is positioned inside the vehicle.

9. The vehicle fob device of claim 8, wherein the master fob and the slave fob are identified by fob IDs, respectively.

10. The vehicle fob device of claim 8, wherein the first and second position information of the master fob and the slave fob is obtained through data communication with the LF antennas which are disposed at locations inside and outside of the vehicle.

11. The vehicle fob device of claim 8, wherein the master fob is a fob key for a driver and is configured to perform a fob function for the vehicle.

12. The vehicle fob device of claim 8, wherein the slave fob is a fob key for a rear occupant and includes a low-cost communication module configured to perform perform LF communication and radio frequency (RF) feedback.

13. The vehicle fob device of claim 12, wherein the slave fob is a wearable device.

14. The vehicle fob device of claim 8, wherein the at least one processor is configured to perform the rear occupant exit alert function when it is determined that the master fob is positioned inside of the vehicle and the slave fob is positioned outside of the vehicle.

* * * * *